US011980908B2

(12) United States Patent
Abraham et al.

(10) Patent No.: US 11,980,908 B2
(45) Date of Patent: May 14, 2024

(54) FOGGING NOZZLE ASSEMBLY COUPLABLE TO A TYPICAL HANDHELD BLOWER

(71) Applicant: DJB Solutions, LLC, Birmingham, MI (US)

(72) Inventors: Bret J. Abraham, Birmingham, MI (US); James M. Abraham, White Lake, MI (US); Alex James Hatch, Hazel Park, MI (US)

(73) Assignee: DJB Solutions, LLC, Birmingham, MI (US)

( * ) Notice: Subject to any disclaimer, the term of this patent is extended or adjusted under 35 U.S.C. 154(b) by 0 days.

(21) Appl. No.: 17/518,509

(22) Filed: Nov. 3, 2021

(65) Prior Publication Data

US 2022/0134365 A1 May 5, 2022

Related U.S. Application Data

(60) Provisional application No. 63/109,297, filed on Nov. 3, 2020.

(51) Int. Cl.
*B05B 7/04* (2006.01)
*B05B 7/00* (2006.01)
(Continued)

(52) U.S. Cl.
CPC .......... *B05B 7/0441* (2013.01); *B05B 7/0081* (2013.01); *B05B 7/10* (2013.01); *B05D 1/02* (2013.01)

(58) Field of Classification Search
CPC ....... B05B 7/0441; B05B 7/0081; B05B 7/10; B05D 1/02; A01M 7/0017; A61M 2206/16
(Continued)

(56) References Cited

U.S. PATENT DOCUMENTS 3,702,306 A * 11/1972 Waldron .................. B05B 7/10 516/6
4,260,079 A * 4/1981 Cary .................. B05B 11/1035 222/214
(Continued)

FOREIGN PATENT DOCUMENTS

KR 100490860 B1 * 5/2005 .............. A01M 7/00
KR 101778971 B1 * 9/2017 .......... A01M 7/0003

OTHER PUBLICATIONS

600W Shop Blower, 2013, Performance Tool, Item No. W50063 Owner's Manual, pp. 1-8 (Year: 2013).*

*Primary Examiner* — Joseph A Greenlund
*Assistant Examiner* — Kevin Edward Schwartz
(74) *Attorney, Agent, or Firm* — The Watson IP Group, PLC; Jovan N. Jovanovic

(57) ABSTRACT

A method and apparatus related to a fogging nozzle assembly including a housing, a metered core, and an air vortex core. The housing includes an air inlet opening at a first end to receive air from a blower distinct from the apparatus, and a fogging outlet opening to output a fog at a second end. The housing couples to a liquid container that stores a fogging liquid and to the blower. The metered core, disposed within the housing, includes a first plurality of radial angled fins to create a low-pressure zone within the housing which draws the fogging liquid from the liquid container into the housing. The air vortex core, disposed between the metered core and the fogging outlet opening, includes a second plurality of radial angled fins to mix the fogging liquid with the air and guide the fog exiting the housing at the fogging outlet opening.

16 Claims, 10 Drawing Sheets

(51) Int. Cl.
*B05B 7/10* (2006.01)
*B05D 1/02* (2006.01)

(58) Field of Classification Search
USPC .......................................................... 239/137
See application file for complete search history.

(56) References Cited

U.S. PATENT DOCUMENTS

| | | | | |
|---|---|---|---|---|
| 4,870,714 | A * | 10/1989 | Miner | E01H 1/0809 15/327.5 |
| 6,108,865 | A * | 8/2000 | Veser | E01H 1/0827 285/402 |
| 6,837,447 | B1 * | 1/2005 | Clark | B05B 7/2427 239/289 |
| 7,552,947 | B2 * | 6/2009 | Ryhman | F16L 37/0987 285/308 |
| 2001/0042927 | A1 * | 11/2001 | Rock | A61M 11/06 261/21 |
| 2006/0022465 | A1 * | 2/2006 | Yamauchi | F16L 21/06 285/402 |
| 2008/0295274 | A1 * | 12/2008 | Osterchill | E01H 1/0836 15/300.1 |
| 2008/0295279 | A1 * | 12/2008 | Alamond | F16L 37/252 15/330 |
| 2011/0198412 | A1 * | 8/2011 | Munn | B05B 9/01 239/302 |
| 2013/0181064 | A1 * | 7/2013 | Sardo | B05B 7/1613 239/69 |
| 2014/0283830 | A1 * | 9/2014 | Zheng | A61M 16/209 128/203.25 |
| 2016/0010855 | A1 * | 1/2016 | Myers | F23D 11/24 239/487 |
| 2018/0207654 | A1 * | 7/2018 | Phua | A61M 11/002 |
| 2019/0335964 | A1 * | 11/2019 | Hoffman | A47L 9/2878 |
| 2020/0149668 | A1 * | 5/2020 | Mason | F16L 33/06 |
| 2020/0222923 | A1 * | 7/2020 | Osborne | B05B 3/022 |
| 2020/0305360 | A1 * | 10/2020 | Lhoste-Clos | B05B 1/005 |
| 2020/0404900 | A1 * | 12/2020 | LaCroix | A01M 9/0038 |
| 2021/0394205 | A1 * | 12/2021 | Simendic | B05B 7/045 |

* cited by examiner

FOGGING NOZZLE ASSEMBLY COUPLABLE TO A TYPICAL HANDHELD BLOWER

CROSS-REFERENCE TO RELATED APPLICATION

This application claims priority from U.S. Provisional Patent Application Ser. No. 63/109,297 filed on Nov. 3, 2020, entitled "FOGGING NOZZLE ASSEMBLY COUPLABLE TO A TYPICAL HANDHELD BLOWER", the entire disclosure of which is hereby incorporated by reference in its entirety.

BACKGROUND OF THE DISCLOSURE

1. Field of the Disclosure

The disclosure relates in general to a nozzle assembly, and more particularly, to a fogging nozzle assembly couplable to a typical handheld blower.

2. Background Art

Multiple industries require the application of liquid based chemicals through means of fogging, such as Ultra Low Volume (ULV) fogging, to dispense chemicals, without alteration to their composition. Typical low-cost foggers, self-contained units with internal motor assemblies are powered via alternating current, batteries, or fuel, are able to perform such fogging.

In case of a part failure, motors and replacement parts can be hard to find for typical low-cost foggers, and are costly to repair. The performance of these typical low-cost foggers, in terms of disbursed liquid droplet size, distance traveled of output fog, rate of liquid consumption, and application and tank size, is limited to specifications as established at a time of manufacture.

Typical foggers also have limited range of operation, in that they are unable to achieve consistent fogging while the output is positioned vertically upwards or downward. They also can be prone to unwanted leaking resulting in liquid chemical product loss. These typical foggers can produce significant pressure and throw of air molecules; however, these products are not configured to dispense or interact with their stored liquids.

SUMMARY OF THE DISCLOSURE

The disclosure is directed to an apparatus that includes a housing, a metered core, and an air vortex core. The housing includes a first end and a second end. The housing includes an air inlet opening at the first end to receive air from a blower distinct from the apparatus and a fogging outlet opening to output a fog at the second end. The housing is to couple to a liquid container that stores a fogging liquid and to the blower. The metered core, disposed within the housing, includes a first plurality of radial angled fins to create a low-pressure zone within the housing. The low-pressure zone is lower pressure than an atmospheric pressure inside the liquid container and draws the fogging liquid from the liquid container into the housing, The air vortex core, disposed within the housing between the metered core and the fogging outlet opening, includes a second plurality of radial angled fins to mix the fogging liquid with the air and guide the fog exiting the housing at the fogging outlet opening.

In at least one configuration of the apparatus, the blower is part number BBB by COMP.

In at least one configuration of the apparatus, the apparatus further comprises a check valve to equalize an air pressure inside the liquid container with the atmospheric pressure as the fogging liquid is dispensed from the liquid container.

In at least one configuration of the apparatus, the check valve is a rubber check valve.

In at least one configuration of the apparatus, the metered core includes a first end and a second end, the first plurality of radial angle fins being disposed at the first end of the metered core and a liquid tube coupler being disposed at the second end of the metered core. The liquid tube coupler is coupled to a liquid tube disposed within the liquid container and coupled to the metered core.

In at least one configuration of the apparatus, the blower coupler includes a lock bar that is disposed at the air inlet opening, the lock bar mating with notches within a housing of the blower to couple the apparatus to the blower.

In at least one configuration of the apparatus, wherein the lock bar is positionable at two depths closer and farther from the first end of the housing.

In at least one configuration of the apparatus, the apparatus further comprises a retaining ring to secure the blower coupler to the housing.

In at least one configuration of the apparatus, the retaining ring includes a first inside diameter at a first end of the retaining ring, a second diameter at a second end of the retaining ring, thereby forming a lip at the second end of the retaining ring, and the retaining ring including first threads disposed proximate to the second end to screw onto second threads disposed on an outside surface of the air inlet opening to secure the blower coupler to the housing.

In at least one configuration of the apparatus, the retaining ring is secured to the housing via a plurality of fasteners.

In at least one configuration of the apparatus, the apparatus further comprises an adjustable metering mechanism to adjust an amount of the fogging liquid being drawn from the liquid container into the housing.

In at least one configuration of the apparatus, the apparatus further comprises a rigid stop disposed below the adjustable metering mechanism to prevent the adjustable metering mechanism from decoupling from the housing.

In at least one configuration of the apparatus, the adjustable metering mechanism includes a threaded rod having a tapered needle point, the metered core including a threaded opening to accept the threaded rod.

In at least one configuration of the apparatus, the blower coupler includes a lock bar that is disposed at the air inlet opening, the lock bar mating with notches within a housing of the blower to couple the apparatus to the blower.

In at least one configuration of the apparatus, the liquid container includes an opening with first threads on an outside surface thereof to screw onto corresponding second threads on an inside surface of a container adapter to secure the liquid container to the container adapter.

In at least one configuration of the apparatus, the apparatus further comprising a first air path between the air vortex core and the housing and a second air path between the air vortex core and the metered core.

In at least one configuration of the apparatus, an angle between two adjacent radial fins from the second plurality of radial fins is 45 degrees.

In at least one configuration of the apparatus, an angle between two adjacent radial fins from the first plurality of radial fins is approximately equal to the angle between the two adjacent radial fins from the second plurality of radial fins.

In at least one configuration of the apparatus, the apparatus further comprises a locating channel member coupled to the metered core to align and securing the metered core to the housing.

The disclosure is also directed to a method comprising receiving, by a housing including a first end, a second end, and an air inlet opening at the first end, air from a blower distinct from the housing; outputting, by a fogging outlet opening at the second end of the housing, a fog; creating, by a metered core disposed within a housing and including a first plurality of radial angled, a low-pressure zone that is lower pressure than an atmospheric pressure inside a liquid container that stores a fogging liquid and that draws the fogging liquid from the liquid container into the housing; mixing, by an air vortex core disposed within the housing between the metered core and the fogging outlet opening and including a second plurality of radial angled fins, the fogging liquid with the air from a blower distinct from the housing; and guiding, by the second plurality of radial angled fins, the fog exiting the housing at the fogging outlet opening.

In at least one configuration of the method, the method further comprises equalizing, by a check valve, an air pressure inside the liquid container with the atmospheric pressure as the fogging liquid is dispensed from the liquid container.

BRIEF DESCRIPTION OF THE DRAWINGS

The disclosure will now be described with reference to the drawings wherein.

DETAILED DESCRIPTION OF THE DISCLOSURE

Figure 1:
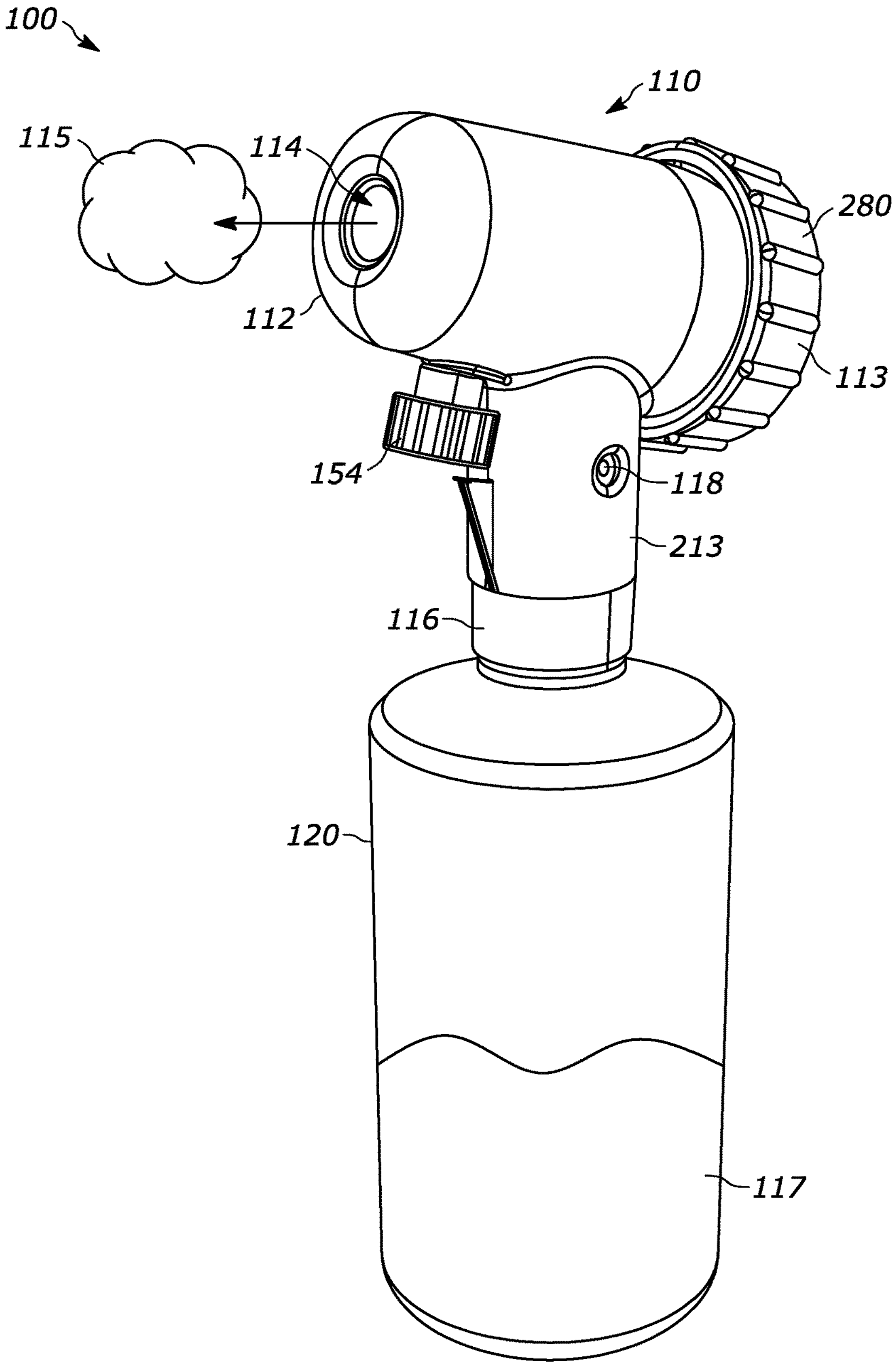
FIG. 1 illustrates an isometric view of an example nozzle assembly once assembled, in accordance with at least one configuration.

While this disclosure is susceptible of configuration in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

In accordance with configuration(s) disclosed herein, a nozzle assembly is disclosed that converts one or more existing external air blower products into a fogger, such as an Ultra-Low Volume (ULV) fogger. In at least one configuration the nozzle assembly also allows a user to change liquid droplet sizes of its output and an application rate, thereby having a wide range of output liquid droplet sizes, and liquid application rate, output distance, and tank sizes. As will be discussed below, a small number of components and easy assembly allow for easy servicing of the nozzle assembly. Such features overcome deficiencies associated with typical foggers, as discussed above.

As discussed in more detail below, during use of the nozzle assembly, the nozzle assembly is attached to a typical blower product, such as via a common twist lock technology. Fogging liquid to be fogged is held in a liquid container that attaches to the underside of the nozzle assembly. When the blower is engaged, fast moving air moves through the chambers of the nozzle. The air from the blower moving inside the nozzle assembly creates a low pressure siphon feed of the fogging liquid from the liquid container which exits out an output portion of the nozzle assembly, and is then mixed with high speed air stream generated by the blower to produce a fine fog with droplets, e.g., between 0-50 micron size, that are projected a distance, e.g., between 2-12 feet, from the output portion of the nozzle assembly.

Referring now to the drawings and in particular to FIG. 1, an apparatus is disclosed, such as a nozzle assembly 100 the components of which can be manufactured via plastic injection molding. The nozzle assembly 100 is comprised of a housing 110 that includes a first end 111 and a second end 112. The housing 110 includes an air inlet opening 113 at the first end 111 to receive air 501 (FIG. 5) from a typical blower 510 (FIG. 5) distinct from the nozzle assembly 100. In at least one configuration, the blower 510 is Model W50063 (600 W, 16,000 RPM, 120V AC 50-60 Hz) by Performance Tool Inc., although any number of typical blowers made by any of a number of companies can be used with the nozzle assembly 100. As typical blowers typically have variable speed settings, such setting provide variance to output fog 115 produced by the nozzle assembly 100 in terms of distance, pressure, and droplet size. Consistent droplet size and application rates can be set through a combination of blower air speed settings, and siphon metering adjustment via a knob 154, discussed in more detail below.

Figure 2:
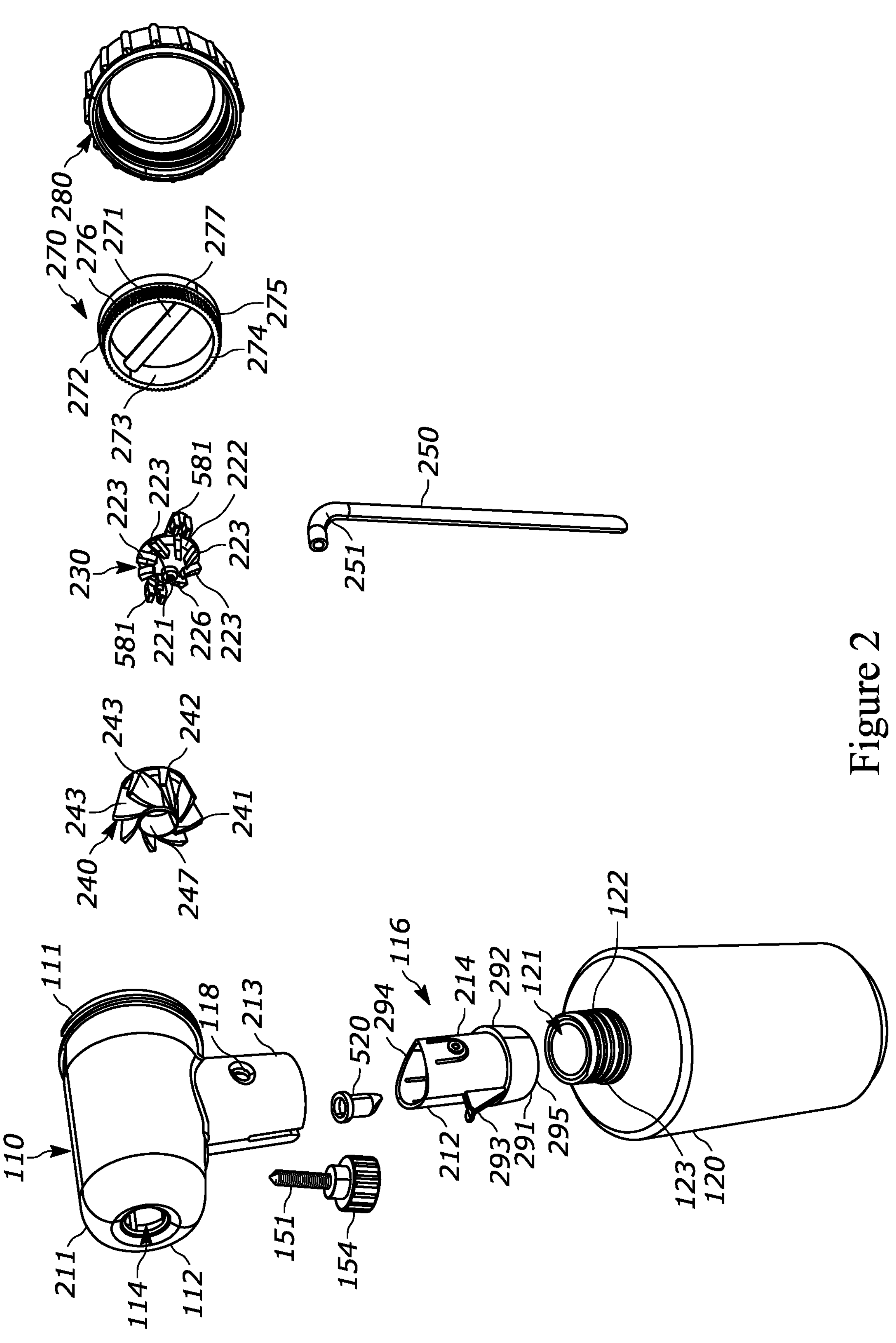
FIG. 2 illustrates an exploded view of the nozzle assembly shown in FIG. 1, in accordance with at least one configuration.

In the configuration shown, the housing 110 is comprised of a main nozzle housing 211 and a leg portion 213, as more clearly shown in FIG. 2. The main nozzle housing 211 is the main portion of the housing 100 in which components for generating the fog 115 are disposed. The main nozzle housing 211 is cylindrical, tapering from the first end 111 thereof to the second end 112 thereof. The housing 110 further includes a fogging outlet opening 114 to output the fog 115 at the second end 112 of the housing 110. In at least one configuration, the leg portion 213 can be an integral part of the upper portion, or alternatively, can be a distinct portion that is fixedly coupled (e.g., bolted or screwed) to form the housing 110. In at least one configuration of the nozzle assembly 100, the leg portion 213 is angle (e.g., approximately 75 degree) toward the air inlet opening 113.

In at least one configuration, the leg portion 213 includes an access hole 118 that extends through the leg portion 213 to allow atmospheric pressure to enter the liquid bottle 120 via the check valve 520. Although not shown, the leg portion 213 can include a second access hole on an opposite side of the leg portion 213 from the access hole 118. The inside diameter of the leg portion 213 is sized to accept a container adapter 116. The container adapter 116 includes a first end 294 and a second end 295. The container adapter 116 can include a locking tab 214 (FIG. 2) that includes a hole therethrough that aligns with the access hole 118 once the leg portion 213 and the container adapter 116 are coupled together. The locking tab 214 engages with the access hole 118 to lock the container adapter 116 and the leg portion 213 together.

Figure 7B:
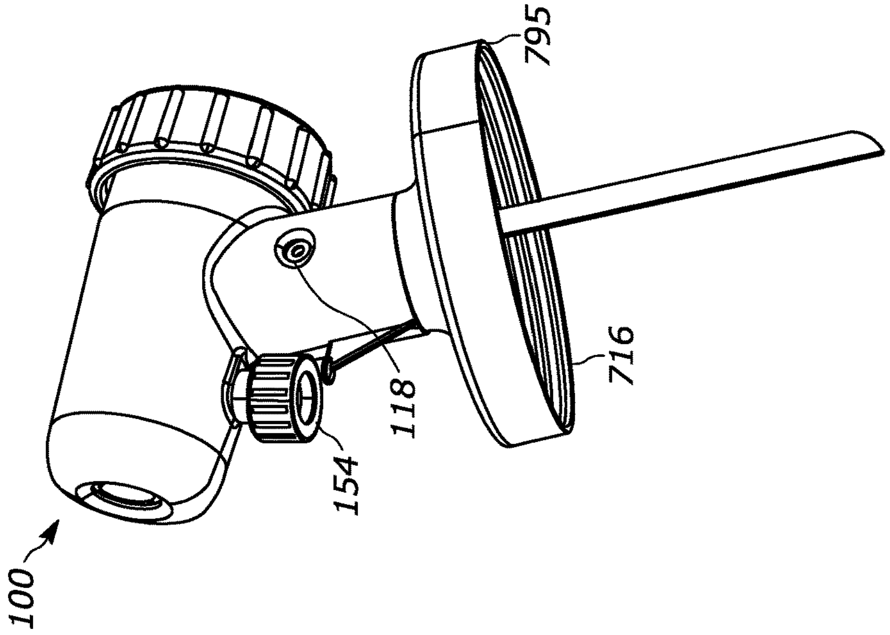
FIGS. 7*a*-7*e* illustrates various alternate configurations for the nozzle assembly, in accordance with at least one configuration.

In at least one configuration, a rigid block or rigid stop 293 is disposed below the adjustable metering mechanism 550 to prevent the adjustable metering mechanism 550 from unscrewing and decoupling from the housing 110 during use of the nozzle assembly 100. In the example shown, the rigid stop 293 is triangular in shape, extending perpendicular on one edge thereof from the container adapter 116. The liquid container 120 includes an opening 121 with threads 122 on an outside surface 123 thereof to screw onto corresponding threads 291 disposed on an inside surface 292 of the container adapter 116 at the second end 295 thereof to secure the liquid container 120 to the container adapter 116. FIG. 7*b* shows an alternative container adapter 716 that includes an alternative second end 795 that is wider than the second end 295 of the container adapter 116. This second end 795 can be coupled to a liquid container (not shown) that has a wider opening than the liquid container 120.

Figure 3B:
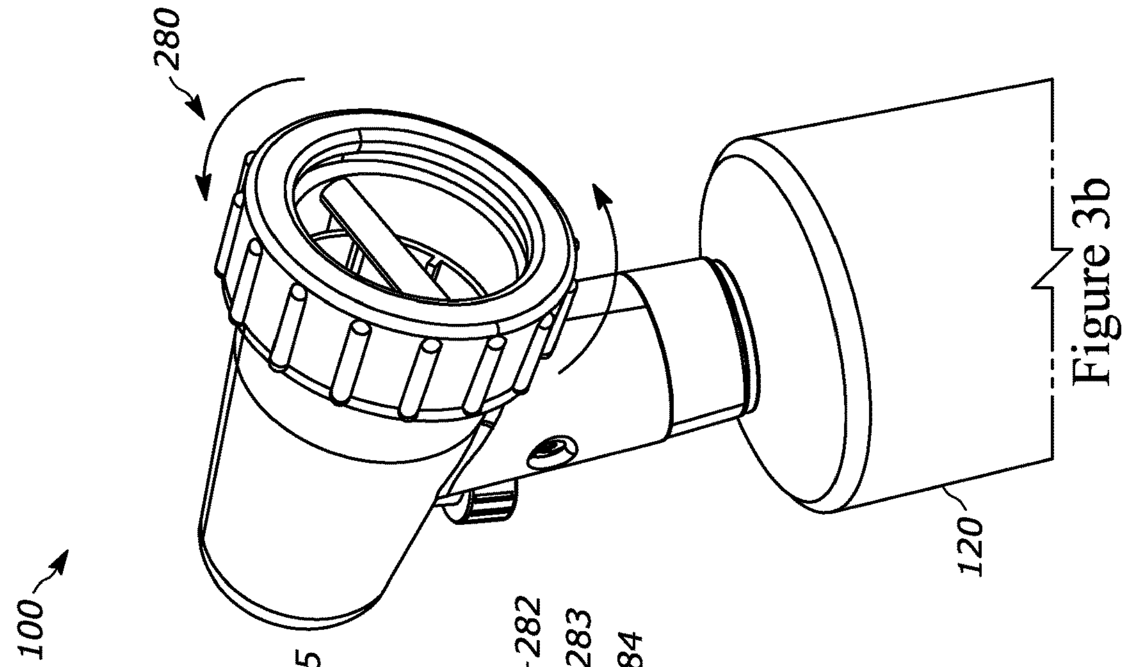
FIGS. 3*a* and 3*b* illustrate an isometric view of a coupling of a lock bar to a housing of the nozzle assembly, in accordance with at least one configuration.
Figure 3A:
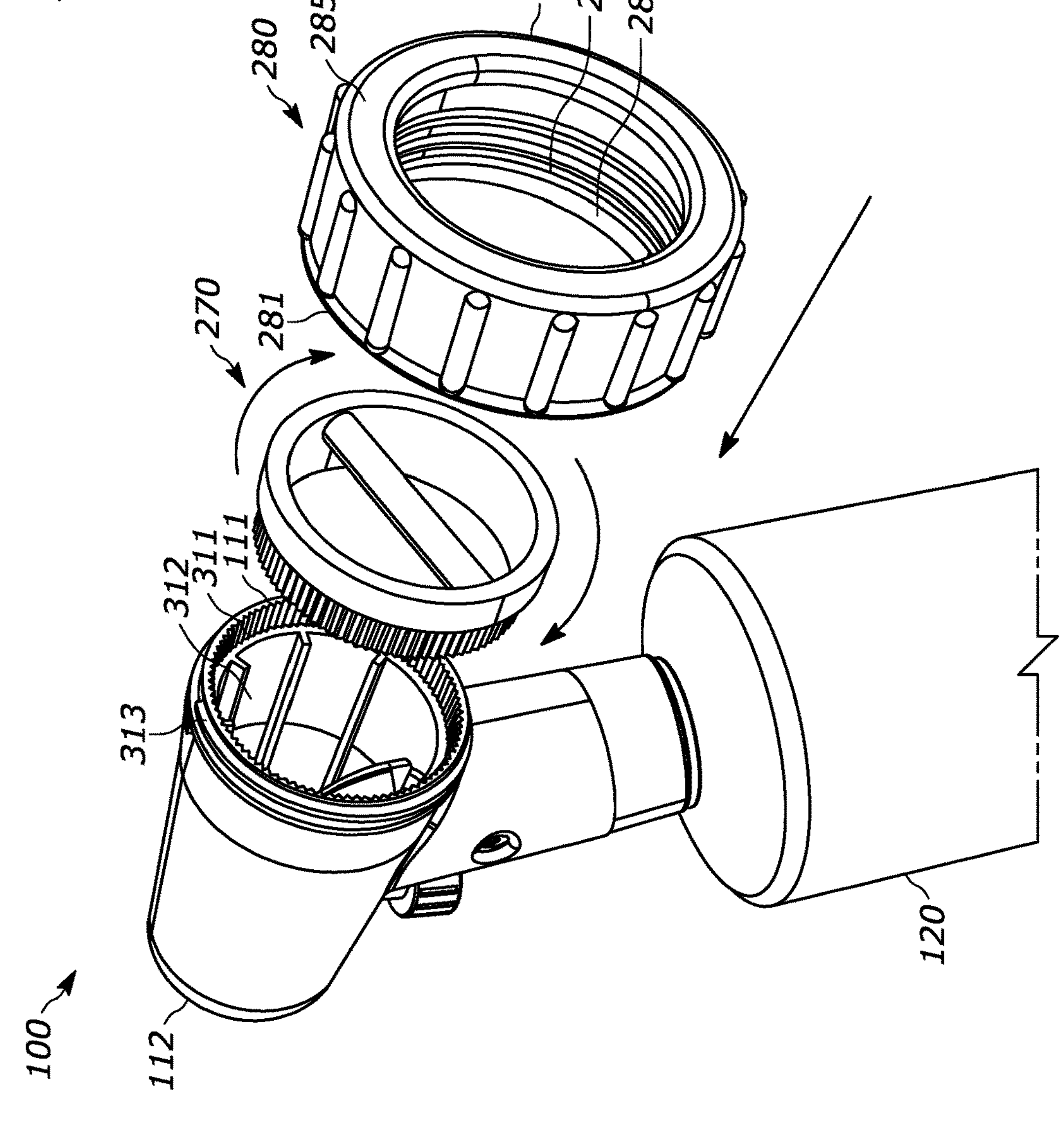
Figure 4B:
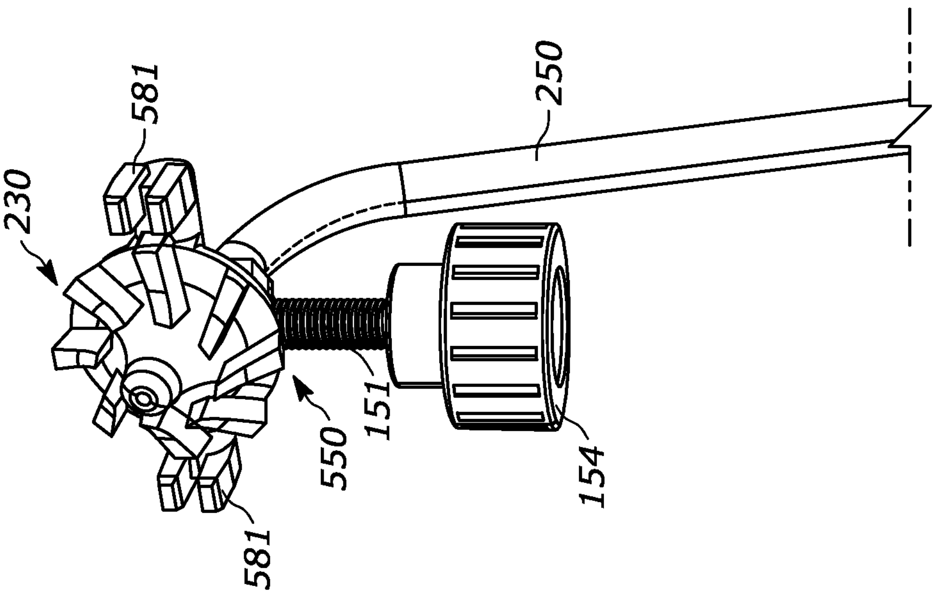
FIGS. 4*a* and 4*b* illustrate different isometric views of a metered core coupled to a liquid tube, in accordance with at least one configuration.
Figure 4A:
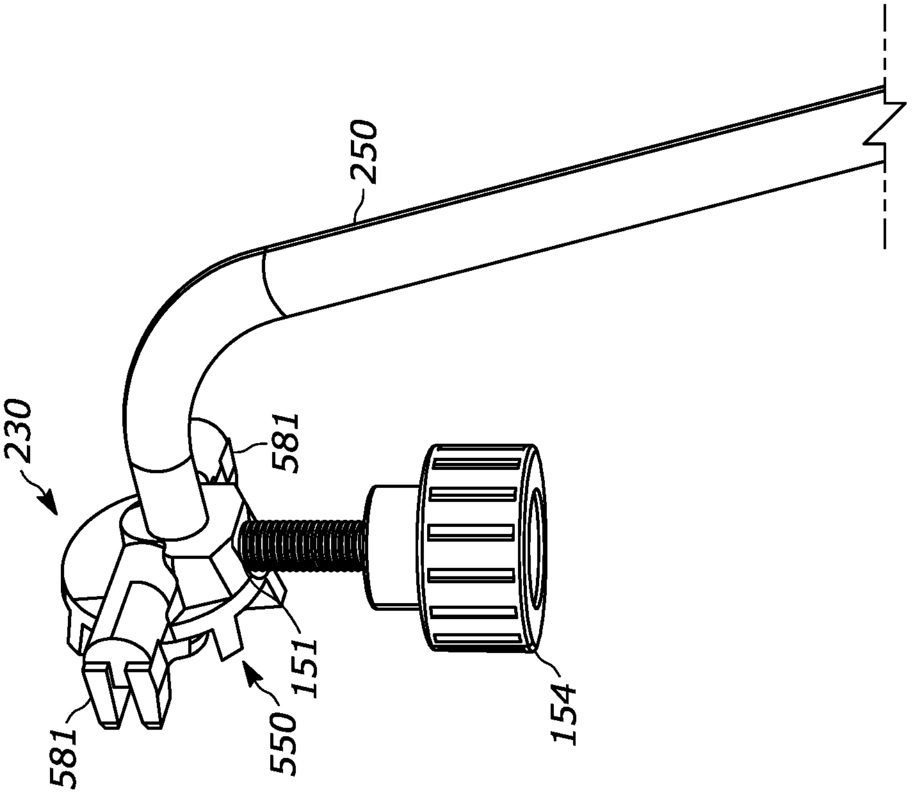

In at least one configuration, the blower coupler 270 includes a lock bar 271 that, when the nozzle assembly 110 is assembled, is disposed at the air inlet opening 113. The blower coupler 270 includes a coupler ring 272, with the lock bar 271 being fixedly coupled to an inner surface 273 of the coupler ring 272. The coupling ring 272 includes a first end 274 and a second end 275. The coupling ring 272 further includes teeth 276 disposed on an outside surface 277 of the coupling ring 272. These teeth 276 mate with teeth 311 (FIG. 3*a*) disposed on an inside surface 312 of the housing 110, at the second end 112 of the housing 110. As shown in FIG. 3*a*, the blower coupler 270 can be rotated to orient the lock bar 271 where desired at which time the blower coupler 270 is slid into the housing 110 at the second end 112 of the housing 110.

Figure 7A:
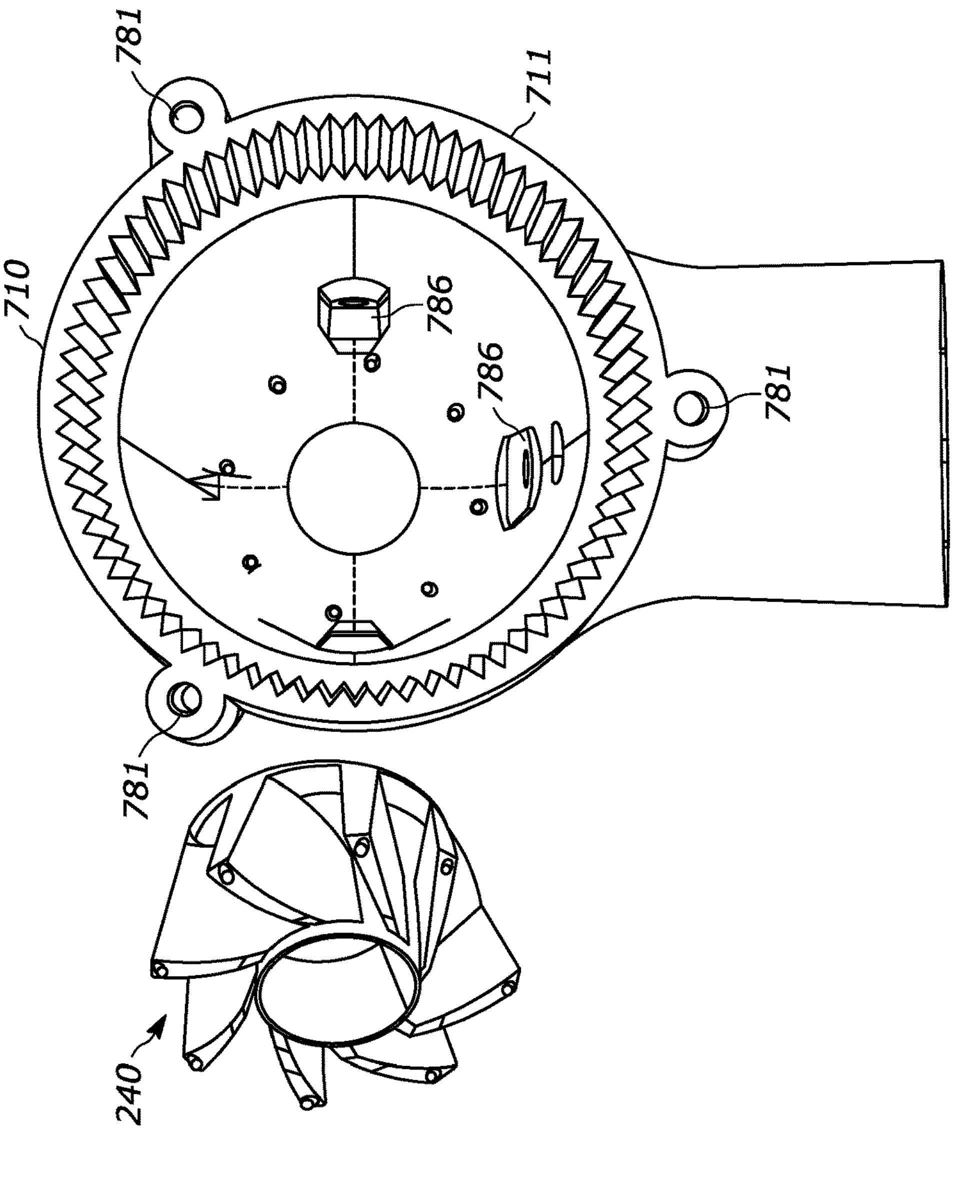
Figure 7C:
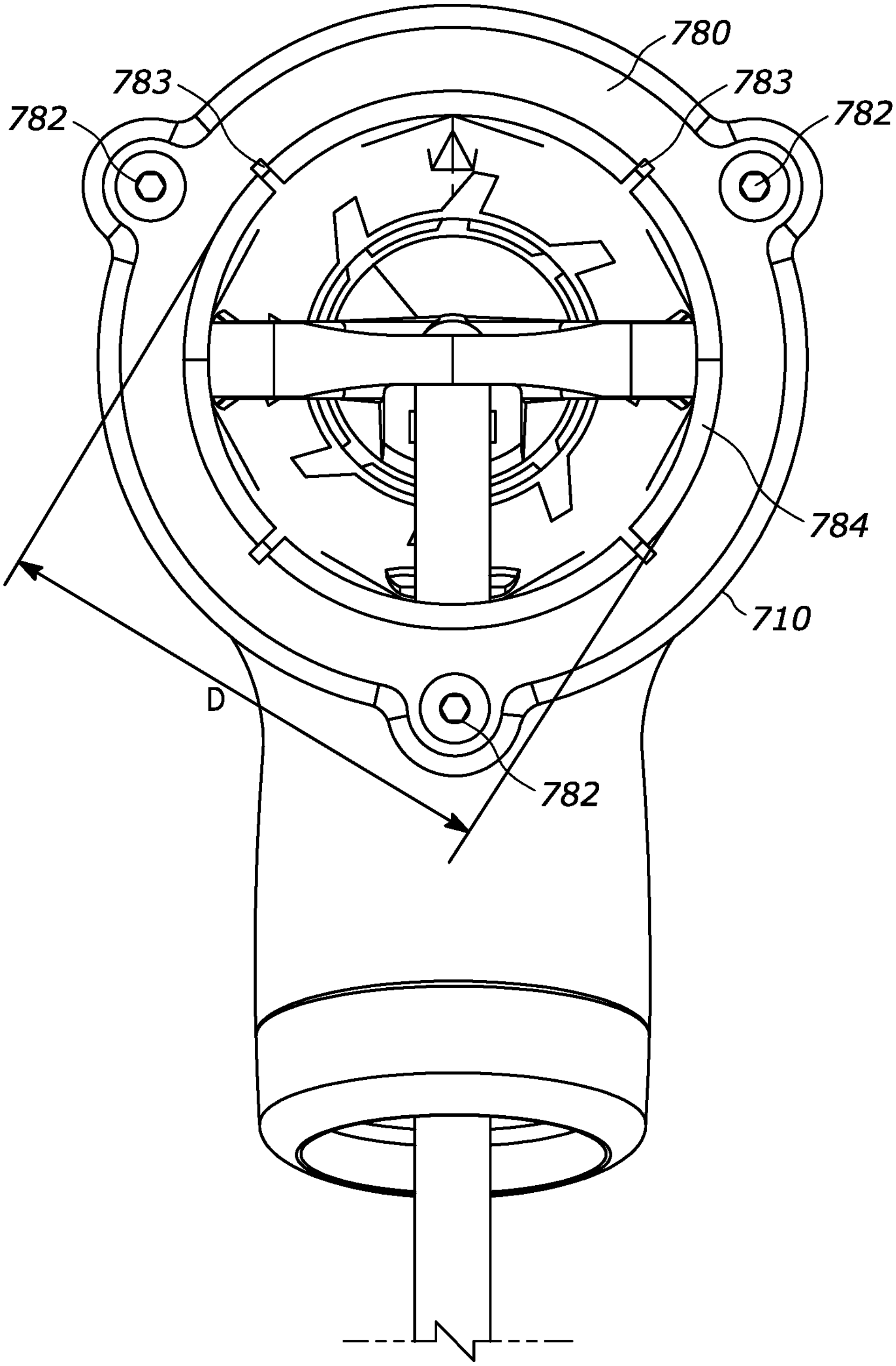
Figure 7D:
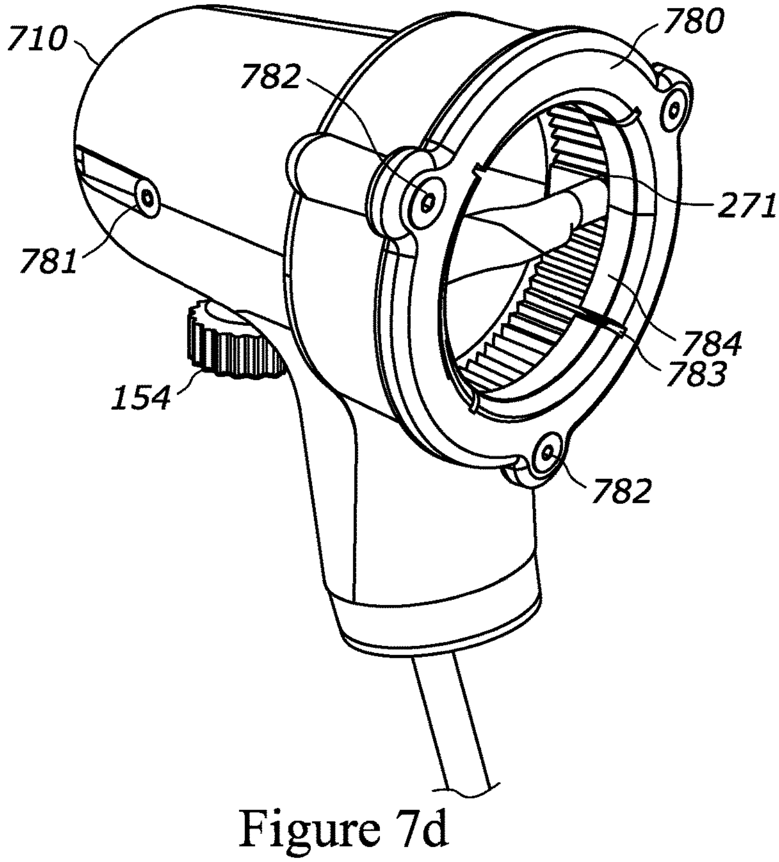
Figure 7E:
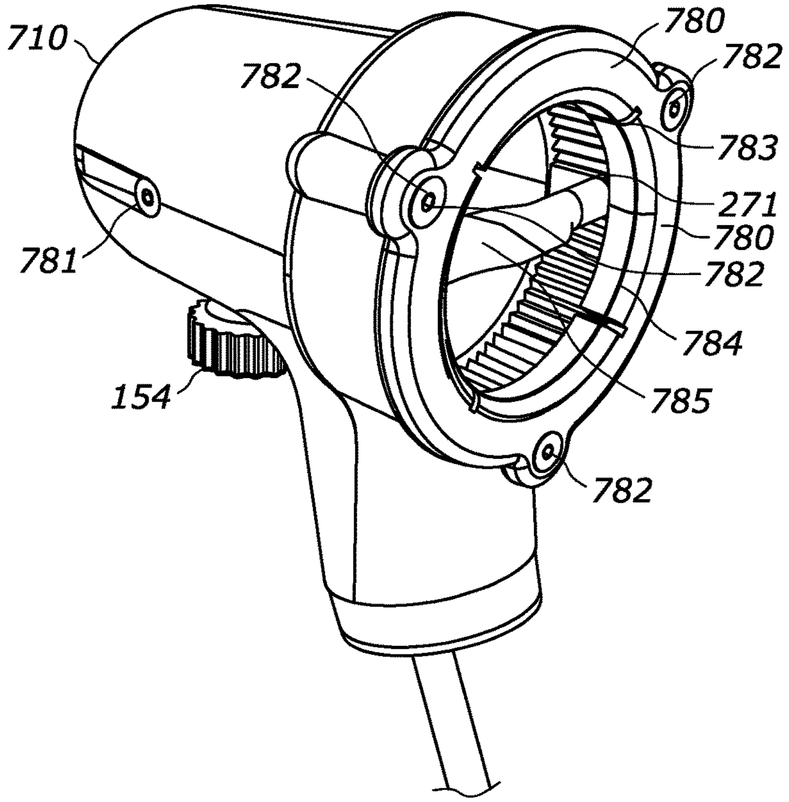

In at least one configuration, the lock bar 271 can be made to be symmetric so that the lock bar 271 can be flipped to have two depth positions expanding a range of blowers that the lock bar 271 can be used with. This flipping results in the lock bar 271 being oriented closer or farther from the first end 111 of the housing 110. To aid a user with identifying which way the lock bar 271 is so positioned, the lock bar can include text 785 disposed on the lock bar 271, as shown in FIGS. 7*c*-7*e*. As shown, the text 785 closest to the first end 111 changes depending upon this orientation. Although the lock bar 271 is shown as being usable with the housing 110, once skilled in the art would understand that the type of blower coupler can vary depending upon the specific configuration of the blower 510, the blower coupler 270 being just one example thereof.

The nozzle assembly 100 further includes a retaining ring 280 (e.g., rigid molded plastic, a high durometer rubber material or a combination of dual-durometer rubber over-molded rigid plastic) to secure the blower coupler 270 to the housing 110. The retaining ring 280 includes a first end 281 and a second end 282. The retaining ring 280 includes threads 283 on an inside surface 284 thereof, the threads 283 being disposed proximate to the first end 281 of the retaining ring 280. An inside diameter of the second end 282 is smaller than an inside diameter of the first end 281, such that the retaining ring 280 includes a lip 285 disposed at the second end 282 to press against the blower coupler 270 once installed. Once the retaining ring 280 is screwed onto the housing 110, that is the threads 283 of the retaining ring 280 are screwed onto threads 313 disposed at the first end 111 of the housing 110, the lip 285 of the retaining ring 285 secures the blower coupler 270 to the housing 110.

Figure 6A:
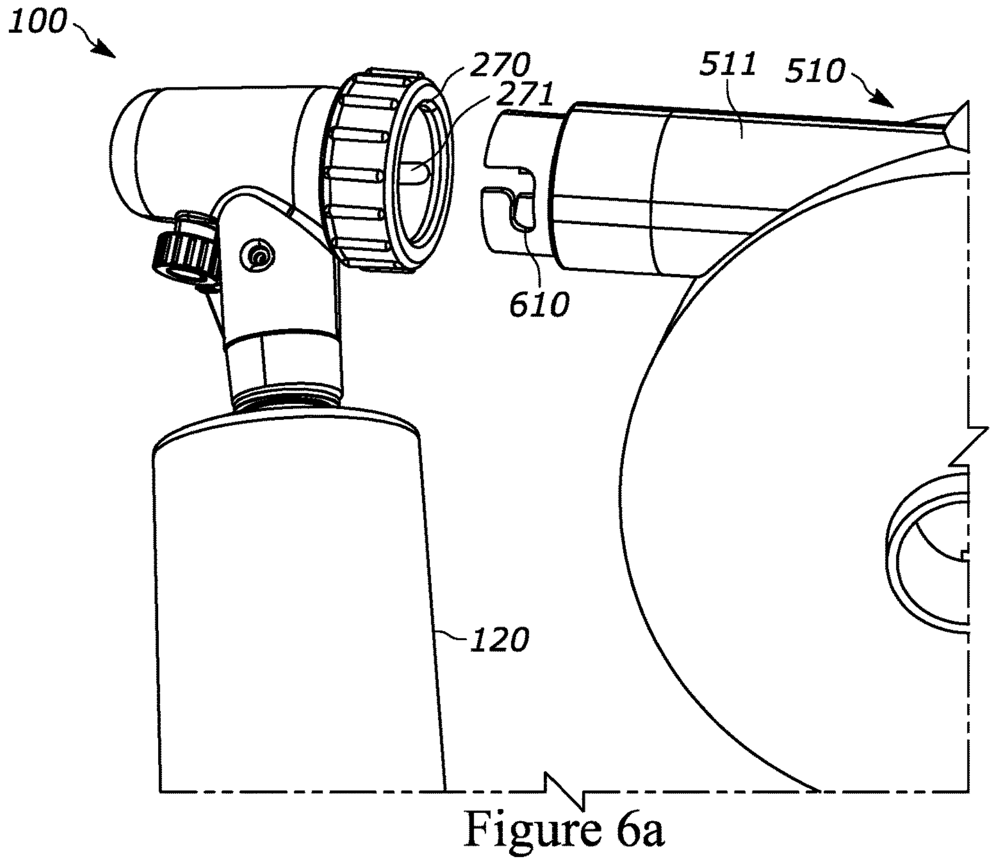
FIG. 6*a*-6*d* illustrates a coupling of the nozzle assembly to the blower, in accordance with at least one configuration.
Figure 6B:
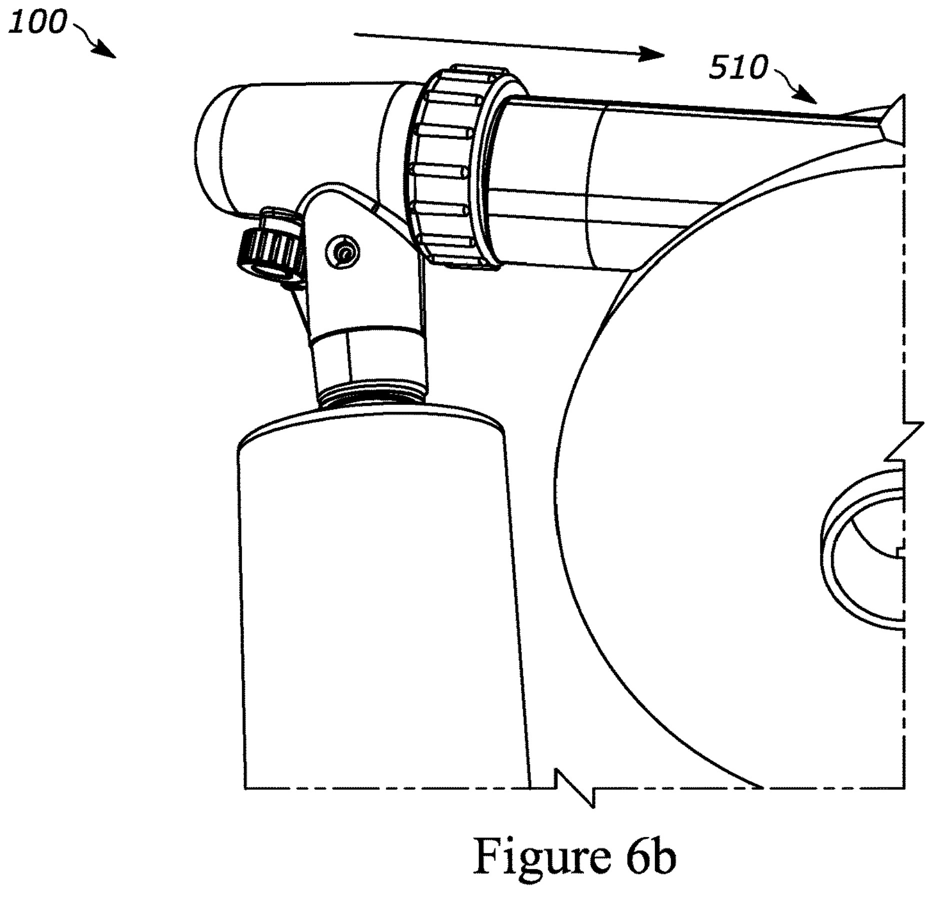
Figure 6D:
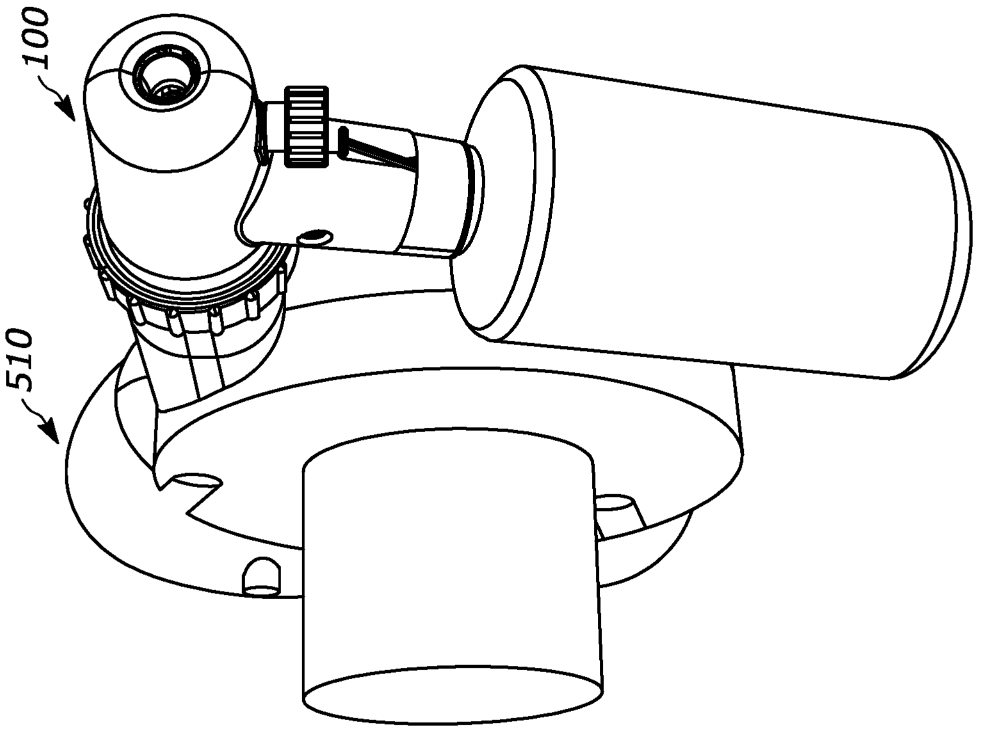
Figure 6C:
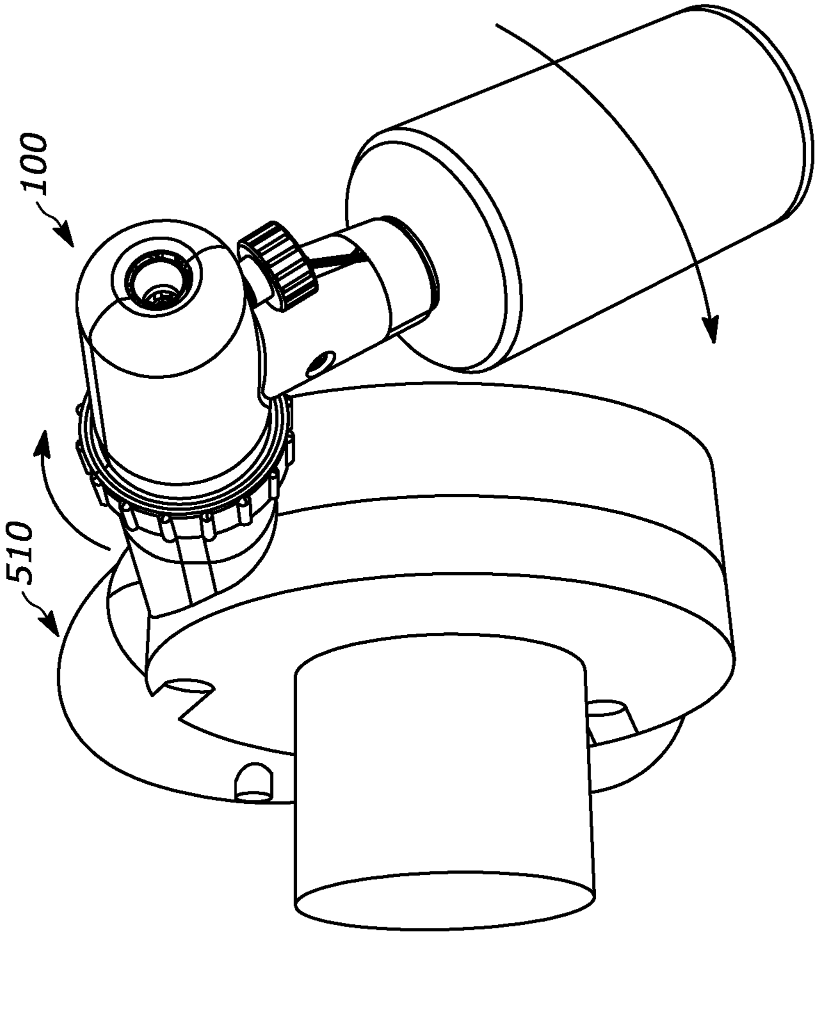

As shown in FIG. 6*a*, the lock bar 271 mates with notches 610 (e.g., push and twist notches as shown) within a housing 511 of the blower 510 to couple the nozzle assembly 100 to the blower 510. FIG. 6*b* shows the nozzle assembly 100 pushed against blower 510 once the lock bar 271 is disposed within the notches 610. Thereafter, the nozzle assembly 100 is rotated (FIG. 6*c*) to lock the nozzle assembly 100 to the blower 510. FIG. 6*d* shows the nozzle assembly 100 having been properly installed onto the blower 510, in proper vertical orientation and alignment, and secured. Should the nozzle assembly 100 be out of line with the blower 510 once they are coupled together, an angle between the nozzle assembly 100 can be adjusted according to FIGS. 3*a* and 3*b* for proper alignment, as discussed above. As shown in FIG. 3*a*, the blower coupler 270 can be removed and re-installed, shown in FIG. 3*b*, into the housing 110, and re-secured with the retaining ring 280 once the desired angle of the lock bar 271 is achieved.

In an alternate configuration, instead of the retaining ring 280 being threaded to secure the blower coupler 280 to the housing 110, another type of retaining ring, retaining ring 780 (FIGS. 7*a* and 7*c*-7*e*) can be screwed or bolted onto an alternate housing 710. The housing 710 includes holes, such as three holes 781 shown, at a first end 711 thereof to accept fasteners 782 (e.g., screws or bolts) that secure the retaining ring 780 to the housing 710. In at least one configuration, the retaining rings 280, 780 can include one or more slits 783 (e.g., four slits 783, as shown) evenly disposed around an inside edge 784 of the retaining rings 280, 780 to allow the inside edge 784 to expand and contract slightly to match different configuration of different blowers. Thus, a diameter D of the retaining rings 280, 780 can vary depending upon a particular model of blower 510 that the nozzle assembly 100 is coupled to. Housing 710 can also include notches 786 (FIG. 7*a*) into which a plurality of radial angled fins 243 of an air vortex core 240, discussed in more detail below, can align with to secure and align the air vortex core 240 within the housing 710.

The housing 110 even further includes a container coupler or container adapter, such as a molded and threaded container adapter 116, to couple the nozzle assembly 100 to a liquid container 120 that stores a fogging liquid 117 (e.g., sanitizing liquid, insecticide liquid, etc.) and a blower coupler, such as a blower coupler 270 (FIG. 2), to couple the nozzle assembly 110 to the blower 510. A thread profile of the container adapter 116 can be adjusted to fit a range of capacities and tanks, and holds the liquid container 120 by its threads securely to the nozzle assembly 100. The container adapter 116 can be attached to the housing 110 either with molded plastic tabs, screws, or adhesive. Thus, once skilled in the art would appreciate that various types of container adapters can be used with a single type of housing 110.

A check valve 520 (e.g., rubber, FIG. 5) is disposed approximately in a middle of the container adapter 116, separating atmosphere from inside air and fogging liquid 117 inside of the liquid container 120. The housing 110 further includes a protruding member 521 on a bottom of the housing 110, the protruding member 521 extending into the container adapter 116. The check valve 520 is coupled to this protruding member 521. The check valve 520 is oriented to equalize air pressure inside the liquid container 120 with an atmospheric pressure outside of the nozzle assembly 100 as the fogging liquid 117 is dispensed and an internal air pressure inside the liquid container 120 is lowered. Additionally, this check valve 520 also allows excess fogging liquid 117 that does not turn into the output fog 115 to return to the liquid container 120 and prevents the fogging liquid 117 from escaping the liquid container 120 due to a tight seal and geometry, with fogging liquid 117 and/or air 501 only being able to enter the liquid bottle 120 in one direction. This return of the fogging liquid 117 mitigates waste of the fogging liquid 117 that occurs with typical foggers.

The nozzle assembly 100 also includes a metered core 230 (FIG. 2) that is disposed within the housing 110. The metered core 230 includes a first end 221 and a second end 222, the first end 221 pointing toward the fogging outlet opening 114 and the second end 222 pointing toward the air inlet opening 113. The metered core 230 includes a plurality of evenly disposed radial angled fins 223 (e.g., forming an angle of xxx degrees between two adjacent fins thereof) disposed at the first end 221 of the metered core 230. In the configuration shown in FIG. 2, the metered core 230 includes eight (8) such radial angled fins 223, although more or less radial angled fins 223 are possible. The metered core 230, via the plurality of radial angled fins 223, creates a low-pressure zone within the housing 110 at the first end 221 of the metered core 230. This low-pressure zone is a lower pressure than atmospheric pressure inside the liquid container 120 which draws or siphons the fogging liquid 117 from the liquid container 120 into the housing 110. This pressure differential flexes open the check valve 520 and allows the nozzle assembly 100 to be used in numerous orientations.

Figure 5:
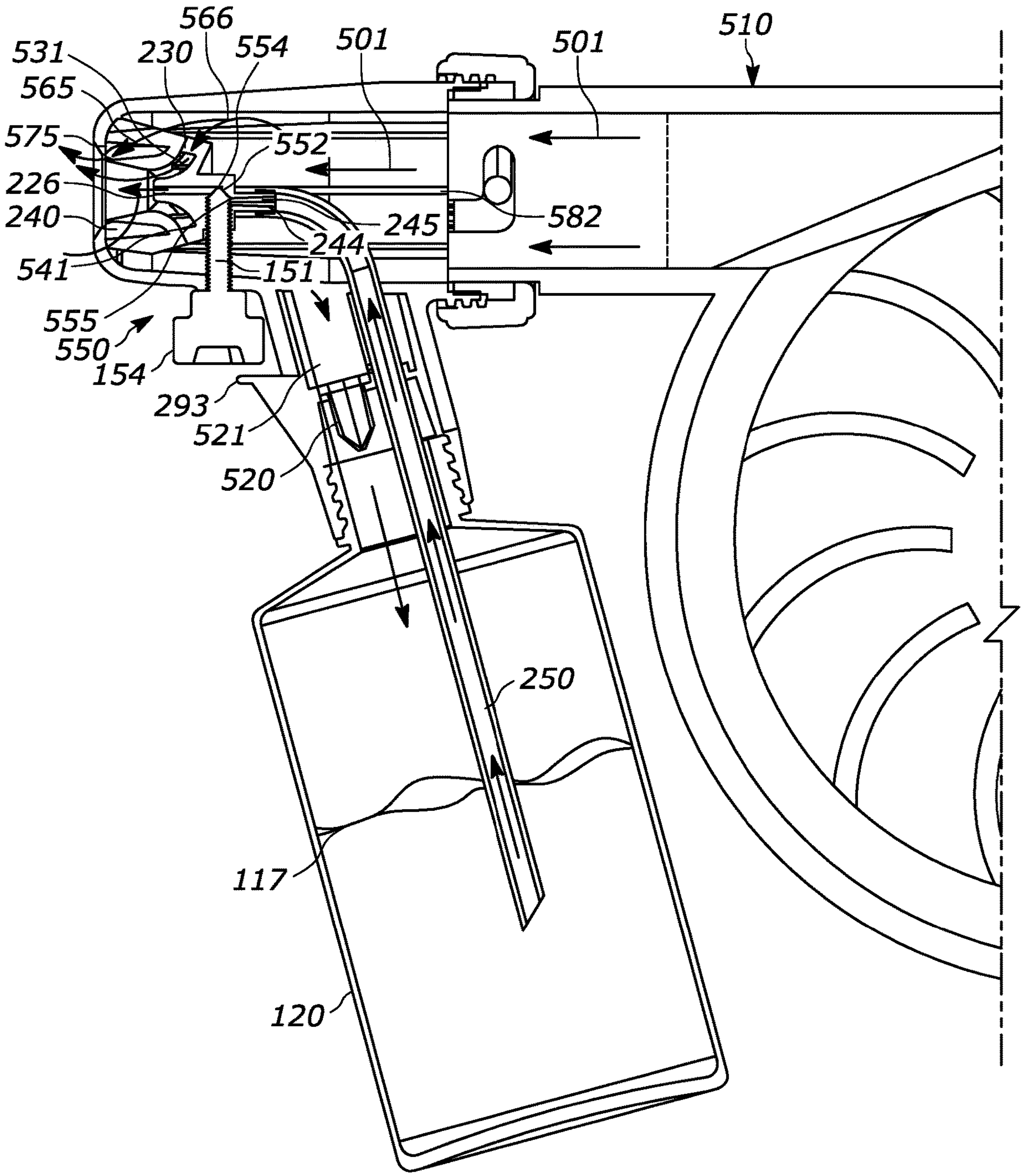
FIG. 5 illustrates a cross-sectional view of the apparatus coupled to a blower, in accordance with at least one configuration.

The nozzle assembly 100 yet further includes the air vortex core 240 that is disposed within the housing 110 between the metered core 230 and the fogging outlet opening 114. The air vortex core 240 includes a first end 241 and a second end 242. As can be seen in FIG. 5, once the nozzle assembly 100 is assembled, the first end 221 of the metered core 230 includes a concave contour 531 (FIG. 5) to sit flush against a matching convex contour 541 (FIG. 5) disposed at the second end 242 of the air vortex core 240, the contours 531, 541 forming a substantially airtight seal between metered core 230 and the air vortex core 240. The air vortex core 240 also includes a plurality of radial angled fins 243 (e.g., forming an angle of xxx degrees between two adjacent fins thereof) that mix the fogging liquid 117 with the air 501 and guide the fog 115 exiting the housing 110 at the fogging outlet opening 114.

The air vortex core 240 can be molded (e.g., injection molded) at a set angle with any two adjacent of its radial angled fins 243. In at least one configuration, an angle between any two adjacent of the radial angled fins 243 of the air vortex core 240 is set to be approximately equal to that of any two adjacent radial fins 223 of the metered core 230. In the configuration shown in FIG. 2, the air vortex core 240 includes eight (8) such radial angled fins 243, although more or less radial angled fins 243 are possible. These radial angled fins 243 are on a perimeter of the metered core 230, with a sloped barrier wall or the convex contour 541 separating the output of the air vortex core 240 from the output of the metered core 230. The convex contour 541 is a thin member forming an opening 247 that extends from the first end 241 to the second end 242 that gives the air vortex core 240 access to the air and liquid mixture output of the metered core 230 through this opening 247. In at least one configuration, the opening 247 tapers from the first end 241 to a point where the air vortex core 240 and the metered core 230 contact each other when assembled, as shown. Thereafter, the opening 247 flares out to match the concave contour 531 of the metered core 230.

Once the nozzle assembly 100 is assembled, the air vortex core 240 is disposed into a pocket 575 formed on an inside of the housing 110, the pocket 575 matching an outer diameter of the first end 241 of the air vortex core 240. At the second end 242 of the air vortex core 240 is convex contour 541 forming another pocket which allows the metered core 230 to nest centered behind the air vortex core 240. In at least one configuration, the metered core 230 includes two wing shaped locating channel members 581 that are coupled (e.g., integrated) to the metered core 230 at the second end 222 of the metered core 240, on opposite sides of the second end 222. These locating channel members 581 align with fins 582 on an inside surface 501 an inside surface of the housing 110. The locating channel members 581 ensure proper alignment and secure the metered core 230 to the housing 110. In at least one configuration, the air vortex core 240 and the metered core 230 positions are secured in place when the threaded rod 151 is installed through the housing 110 of the nozzle assembly 100 into the metered core 230. In an alternate configuration, the air vortex core 240 and the metered core 230 can be secured with external fasteners. In an alternate configuration, rather than use of the locating channel members 581 to align and secure the metered core 230 to the housing 110, an alternate metered core (not shown) can be secured to the housing 710 via fasteners 781 (FIGS. **7*d* and 7*e***, e.g. screws or bolts).

FIG. 5 also shows a detailed view of the air 501 as it passes over the metered core 230 and the air vortex core 240. Once assembled, the air vortex core 240 and the metered core 230 form a plurality of air paths for the air 501 from the blower 510, such as an outer airstream path 565 and an inner airstream path 566. The air 501 from the blower 510 is diverted by the second end 222 of the metered core 230 such that the air 501 travels over the plurality of radial fins 223 of the metered core 230 along the convex contour 531. At the fogging outlet opening 114, the outer airstream path 565, the inner airstream path 566, and the fogging liquid 117 exiting at the first end 221 of the metered core 230 are mixed a second time, resulting is a further mixing and propulsion of liquid droplets of the fogging liquid 117 through the fogging outlet opening 114 of the nozzle assembly 100. Although two airpaths are shown in FIG. 5, such is shown for simplicity of explanation. One skilled in the art would understand that a plurality of airpaths are formed by the air vortex core 240 and the metered core 230, the number of air paths being dependent upon the number of the plurality of radial fins 223 of the metered core 230 and the plurality of radial fins 243 of the air vortex core 240.

Although the consumption of the fogging liquid 117 and droplet size produced by the nozzle assembly 100 can be fixed at the time of manufacture according to design parameters, in at least one alternate configuration the liquid consumption and droplet size of the nozzle assembly 100 is adjustable. Such adjustment to the consumption of the fogging liquid 117 that is drawn from the liquid container 120 into the main nozzle housing 211, and the droplet size, is achieved through the use of an adjustable metering mechanism 550 (FIG. 5). The adjustable metering mechanism 550 includes a threaded rod 151, e.g., stainless steel, brass, aluminum, etc. The threaded rod 151 has a tapered end 552 which seats into the metered core 230. In at least one configuration, the metered core 230 includes a threaded metal insert 553 embedded in the metered core 230. The threaded rod 151 is coupled to the knob 154 which can be over-molded or mechanically fastened to the threaded rod 151 and that is externally accessible from the housing 110 for this adjustment.

During use of the nozzle assembly 100, the knob 154 is rotated to adjust a size of opening 555 that the tapered end 552 is disposed in front of, as shown. This adjustment can be performed in real-time while the nozzle assembly 100 is in operation, allowing for continuous analog metering of output of the fogging liquid 117 through the adjustable metering mechanism 550. A tip 554 of the tapered end 552 adjustments an amount of access to the chamber 245 of the metered core 230, and the fogging liquid 117 liquid can travel freely from the liquid tube coupler 244, therethrough to the first end 221 of the metered core 230, at which an output port 226 is disposed. Disposed around the perimeter of this output port 226 are the radial angled fins 223 that guide fast moving air over the output port 226 of the metered core 230.

A liquid tube 250 (e.g., flexible, FIG. 2) connects the liquid container 120 and the fogging liquid 117 within the liquid container 120 to an inlet on the metered core 230. The metered core 130 includes a projection or liquid tube coupler 244 disposed at the second end 222 of the metered core 230. Thus, the liquid tube coupler 244 is coupled to the liquid tube 250 that is disposed within the liquid container 120 and coupled to the metered core 230. The liquid tube 250 includes an elbow 251 so that the liquid tube 250 can match an angle of the liquid tube coupler 244. A chamber 245 is disposed within the metered core 230, extending from the liquid tube coupler 244 and exiting at the first end of metered core 230 at which an output port 226 is disposed, on a side of the threaded rod 151 with tapered end 552 where threads can engage. When the threaded rod 151 is backed out from the housing 110, access is given to the chamber 245 disposed within the metered core 230.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A fogging nozzle apparatus structurally configured to be attachable to a blower and to a liquid container, the fogging nozzle comprising:

a housing including a first end and a second end, the housing including an air inlet opening at the first end to receive air from the blower, the blower being distinct from the fogging nozzle apparatus, and a fogging outlet opening to output a fog at the second end, the housing further comprising a container coupler structurally configured to removably couple the housing to the liquid container that stores a fogging liquid, and a blower coupler structurally configured to removably couple the housing to the blower;

a metered core, disposed within the housing, including a first plurality of radial angled fins configured to create a low-pressure zone within the housing as air blows from the blower through the housing, the low-pressure zone being at a lower pressure than pressure inside the liquid container such that the fogging liquid is drawn by siphon through a liquid tube from the liquid container into the housing; and an air vortex core, disposed within the housing between the metered core and the fogging outlet opening, including a second plurality of radial angled fins to mix the fogging liquid with the air and guide the fog exiting the housing at the fogging outlet opening;

wherein the blower coupler includes a lock bar, with the lock bar configured to be attachable to the blower through a twist and lock interface, wherein the blower coupler includes a coupler ring with an inner surface having the lock bar coupled thereto and an outer surface having teeth disposed thereon, the teeth being structurally configured to mate with teeth disposed on an inside surface of the housing proximate to the air inlet opening, and the lock bar being structurally configured to mate with notches on the blower to couples the apparatus to the blower through the twist and lock interface.

2. The apparatus according to claim 1, further comprising a check valve to equalize an air pressure inside the liquid container with atmospheric pressure as the fogging liquid is dispensed from the liquid container.

3. The apparatus according to claim 2, wherein the check valve is a rubber check valve.

4. The apparatus according to claim 1, wherein the metered core includes a first end and a second end, the first plurality of radial angled fins being disposed at the first end of the metered core and a liquid tube coupler being disposed at the second end of the metered core, the liquid tube coupler being coupled to the liquid tube disposed within the liquid container and coupled to the metered core.

5. The apparatus according to claim 1, wherein the coupler ring has a first side and a second side, with both the first side and second side being structurally configured for placement proximate to the air inlet opening of the housing, and wherein the lock bar is coupled proximate to one of either the first side or the second side of the inner surface of the coupler ring.

6. The apparatus according to claim 1, further comprising a retaining ring to secure the blower coupler to the housing.

7. The apparatus according to claim 6, wherein the retaining ring includes a first inside diameter at a first end of the retaining ring, a second diameter at a second end of the retaining ring, thereby forming a lip at the second end of the retaining ring, and the retaining ring including first threads disposed proximate to the second end to screw onto second threads disposed on an outside surface of the air inlet opening to secure the blower coupler to the housing.

8. The apparatus according to claim 6, wherein the retaining ring is secured to the housing via a plurality of fasteners.

9. The apparatus according to claim 1, further comprising an adjustable metering mechanism to adjust an amount of the fogging liquid being drawn from the liquid container into the housing.

10. The apparatus according to claim 9, further comprising a rigid stop disposed below the adjustable metering mechanism to prevent the adjustable metering mechanism from decoupling from the housing.

11. The apparatus according to claim 9, wherein the adjustable metering mechanism includes a threaded rod having a tapered needle point, the metered core including a threaded opening to accept the threaded rod.

12. The apparatus according to claim 1, wherein the liquid container includes an opening with first threads on an outside surface thereof to screw onto corresponding second threads on an inside surface of a container adapter to secure the liquid container to the container adapter.

13. The apparatus according to claim 1, further comprising a first air path between the air vortex core and the housing and a second air path between the air vortex core and the metered core.

14. The apparatus according to claim 1, wherein an angle between two adjacent radial angled fins from the second plurality of radial angled fins is 45 degrees.

15. The apparatus according to claim 1, wherein an angle between two adjacent radial angled fins from the first plurality of radial angled fins is approximately equal to the angle between the two adjacent radial angled fins from the second plurality of radial angled fins.

16. The apparatus according to claim 1, further comprising a locating channel member coupled to the metered core to align and secure the metered core to the housing.

* * * * *